United States Patent Office 3,165,376
Patented Jan. 12, 1965

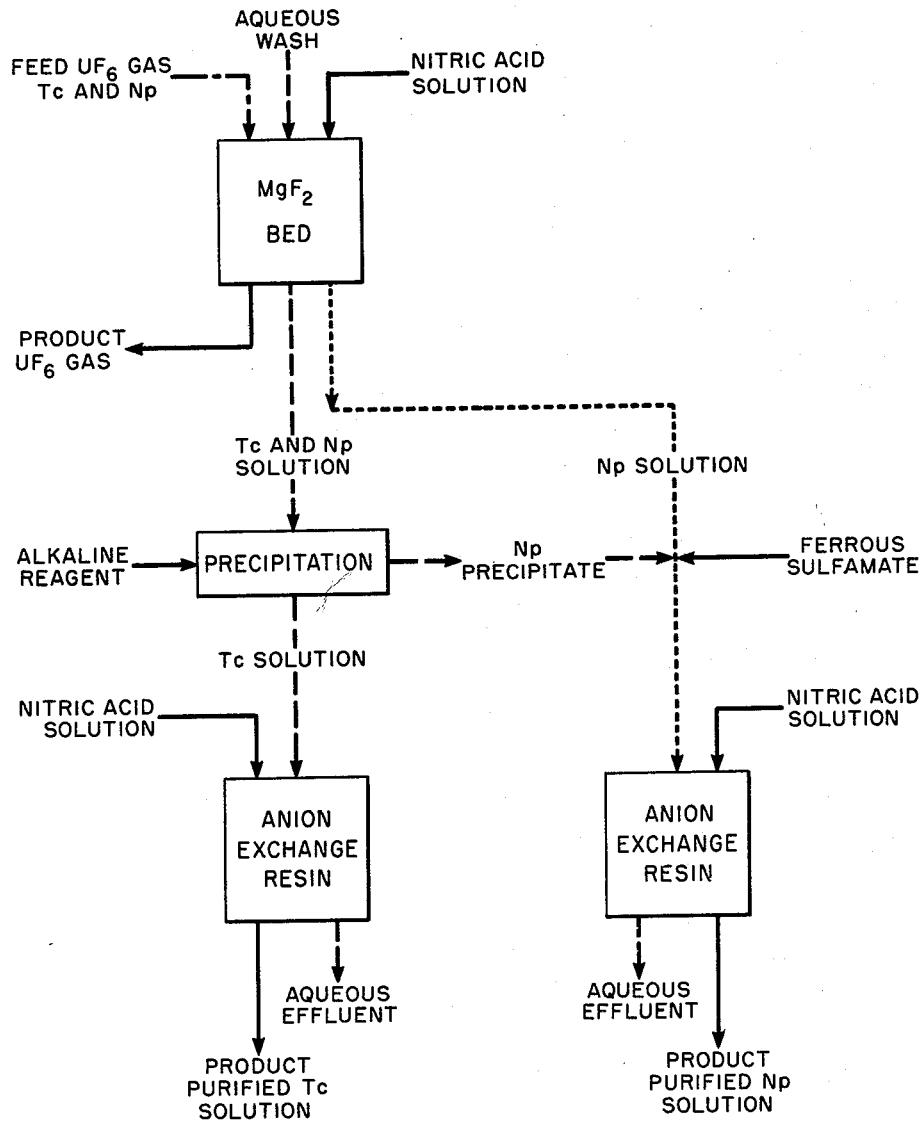

3,165,376
PROCESS FOR SEPARATION AND RECOVERY OF VOLATILE FLUORIDE IMPURITIES FROM URANIUM HEXAFLUORIDE CONTAINING THE SAME
Waldo R. Golliher, Paducah, Ky., assignor to the United States of America as represented by the United States Atomic Energy Commission
Filed Apr. 2, 1962, Ser. No. 184,611
10 Claims. (Cl. 23—14.5)

My invention relates to the processing of uranium hexafluoride and more particularly to a process for separating and recovering volatile fluoride impurities from uranium hexafluoride containing the same.

One of the currently available sources of uranium hexafluoride feed for uranium isotope separation by means of gaseous diffusion is spent nuclear reactor fuel in the form of irradiated natural uranium. This material is reprocessed to recover the fissionable plutonium contained therein and to separate other transuranium elements and fission products from the uranium. Reprocessing is effected by dissolving the irradiated uranium in nitric acid and extracting the uranium and plutonium values with an organic solvent. The uranium and plutonium are then separated by further solvent extraction or ion-exchange treatments. Further details of aqueous separation processes of this type may be seen by reference to Reactor Handbook, volume II, "Fuel Reprocessing," pages 131–184, Second Edition (1961). The purified uranium product, obtained in the form of a uranyl nitrate solution in this type process, is converted to gaseous diffusion feed $UF_6$ by calcining the uranyl nitrate to form $UO_3$, reducing the $UO_3$ to $UO_2$ with hydrogen, reacting the $UO_2$ with HF to form $UF_4$ and reacting the $UF_4$ with fluorine.

Although the bulk of the fission products and transuranium elements are removed by reprocessing the uranium as described above, the product uranium may still contain appreciable quantities of the fission product isotope technetium 99 and the transuranium isotope neptunium 237. The quantity of these isotopes varies with the irradiation history of the uranium and with the particular separation process employed. A typical lot of reprocessed uranium in the form of $UO_3$ may contain about 8 grams of technetium 99 and 0.15 gram of neptunium 237 per ton. These isotopes are partially separated from the uranium product in the conversion of the $UO_3$ to $UF_6$. In the case of technetium 99, about 5 percent is removed with process off-gases and 2 percent remains in the nonvolatile $UF_4$ fluorination ash comprising chiefly unreacted material and contaminants such as corrosion products. A portion of the neptunium 237, i.e., about 5 percent, likewise remains in the fluorination ash. The remaining portion of these isotopes is carried over in the form of volatile fluorides in the product $UF_6$.

Separation of technetium and neptunium fluorides from reprocessed $UF_6$ is desired not only to remove these isotopes and thus avoid the introduction of contaminants which cause difficulty in the gaseous diffusion isotope separation process, but also to provide a source of these isotopes in purified form. Technetium, in the form of pertechnetate ion, is useful as a corrosion inhibitor in aqueous systems. Neptunium is useful for research purposes such as in establishing the chemistry of the transuranium elements.

Various methods for separating volatile technetium and neptunium fluorides from $UF_6$ have been attempted, but none has proven satisfactory, particularly for large quantities of material. Separation has been effected by distillation, but this method is inefficient and impractical for large-scale operation. Aqueous methods such as precipitation, washing and ion-exchange procedures have also been attempted, but these methods are also inefficient and time-consuming.

$UF_6$ may also be contaminated with other volatile fluoride impurities, and in particular molybdenum and vanadium fluorides, which present difficulty in the gaseous diffusion process. These impurities are normally present in substantial amounts in uranium ore concentrates, and removal to a maximum level of one part per million parts $UF_6$ is required in the preparation of feed $UF_6$ for gaseous diffusion. Separation of these impurities from uranium has largely been effected by solvent extraction purification of the ore concentrate prior to converting the concentrate to $UF_6$. Improved processes have recently developed to prepare $UF_6$ from impure ore concentrates without prior solvent extraction purification. In these processes the concentrate is first reacted with hydrogen and then with hydrogen fluoride in fluidized-bed reactors. The resulting crude $UF_4$ is fluorinated in a fluidized-bed reactor to obtain $UF_6$. The bulk of the impurities are removed in non-volatile form in the fluidized-bed reactions, but vanadium and molybdenum accompany the $UF_6$ in volatile fluoride form. Further purification by means of fractional distillation has been required to remove these impurities. Detailed information relative to these processes may be seen by reference to the book, Progress in Nuclear Energy, Series III, Process Chemistry, volume 3, pages 98–125, by Bruce et al. (1961). Despite the extensive purification methods employed, however, small amounts of molybdenum and vanadium fluorides may be present in the product $UF_6$, whether the $UF_6$ is prepared directly from ore concentrates or from reprocessed, irradiated uranium. An additional means for removing these impurities is thus desired.

It is, therefore, an object of my invention to provide a process for purifying $UF_6$ with respect to volatile fluorides of metals in the group comprising technetium, neptunium, molybdenum and vanadium.

Another object is to provide a process for separating technetium and neptunium fluorides from reprocessed $UF_6$.

Another object is to provide a process for separating molybdenum and vanadium fluorides from $UF_6$.

Another object is to provide a process for separately recovering technetium and neptunium values from reprocessed, irradiated uranium in the form of $UF_6$ containing the same.

Another object is to provide a method of recovering technetium values from reprocessed $UF_6$ containing the same.

Other objects and advantages of my invention will be apparent from the following detailed description and claims appended hereto.

In accordance with my invention, volatile fluorides of metals in the group comprising technetium, neptunium, vanadium and molybdenum are separated from $UF_6$ containing the same by contacting the $UF_6$ with magnesium fluoride whereby the volatile fluoride contaminants are selectively sorbed by the $MgF_2$. This process is particularly useful for removing and recovering technesium fluoride whereby the volatile fluoride contami-processing of irradiated uranium. The sorbed technetium and neptunium values are readily desorbed and obtained in high-purity form means of further processing. Volatile molybdenum and vanadium fluorides, which impurities are particularly detrimental to uranium isotope separation by means of gaseous diffusion, are also separated from $UF_6$ by this means.

I have found that magnesium fluoride sorbs the above-mentioned volatile fluoride contaminants from $UF_6$ without sorbing an appreciable amount of $UF_6$ This selective sorption provides the basis for a simple and highly efficient separation process. Alkali metal fluorides such as sodium fluoride and other alkaline earth fluorides such as calcium fluoride are not effective for this purpose because of relatively poor sorption of the volatile fluoride contaminants or because $UF_6$ is also sorbed by these materials.

My invention is not limited to a particular theory concerning the chemical composition of the volatile fluoride contaminants or the physical and/or chemical reactions which occur upon contacting the volatile fluorides with $MgF_2$. The mechanism is referred to herein as "sorption" which is meant to include both adsorption at the surface of the $MgF_2$ and absorption below the surface. It is to be understood that this term is not meant to exclude the possibility that a chemical reaction such as complex formation may occur and that retention of the fluoride contaminants by the $MgF_2$ through any mechanism is included. When contained in reprocessed $UF_6$ neptunium is probably in the form of neptunium hexafluoride. The compound form of the volatile technetium fluoride has not been established. Volatile molybdenum and vanadium fluorides contained in $UF_6$ are postulated to have the following compositions: molybdenum hexafluoride, $MoF_6$, vanadium pentafluoride, $VF_5$, and vanadium oxytrifluoride, $VOF_3$.

Although the process of my invention is not limited to the separation of technetium 99 and neptunium 237, the process will be described primarily with reference to separation and recovery of these isotopes from reprocessed $UF_6$. The concentrations of technetium and neptunium in the $UF_6$ are not critical to my invention, and this process is suitable for reprocessed $UF_6$ containing these isotopes at the level normally encountered, that is, on the order of several grams per ton $UF_6$. Under current reprocessing practice neptunium is frequently separated from the uranium by adjustment of solvent extraction conditions so that the resulting reprocessed $UF_6$ may contain technetium without containing neptunium. These isotopes may be separated by the process described herein whether contained in reprocessed $UF_6$ singly or in combination.

The impure $UF_6$ is preferably contacted with the $MgF_2$ by passing the $UF_6$ in gaseous form through a bed of $MgF_2$ pellets. The $UF_6$ may also be in the liquid state, and liquid-phase contacting presents an advantage in that the $MgF_2$ sorption capacity for technetium is increased. Gas-phase contacting is preferred, however, since this method is far more convenient and the sorption capacity is sufficiently high for effective large-scale operation. The use of a pellet bed is not critical, and other forms of $MgF_2$ which provide for intimate contact, such as a fluidized bed of powdered material, may be employed. A pellet bed is preferred, however, because of its simple, trouble-free operation. The size of the pellets is selected to obtain maximum sorption consistent within minimum interference with gas flow. Pellets within the size range of appriximately 0.09 inch to 0.25 inch in diameter are preferred. Finer material sorbs the fluoride impurities more efficiently, but the accompanying pressure drop across the bed is undesirably high. Suitable pellets may be conveniently prepared by means of a conventional rotating-disc pelletizer wherein $MgF_2$ powder is combined with a small amount, e.g., 25 weight percent, of water and the resulting slurry is shaped into pellets. The pellets are then dried with heated air to a moisture content of about 10 to 12 weight percent. The partially dried pellets are screened to obtain the desired size fraction and contacted with gaseous fluoride to remove the remaining moisture.

The depth of the pellet bed and the velocity at which the $UF_6$ is passed through the bed are adjusted to obtain optimum separation. For example, in a sypical embodiment of my invention suitable for large-scale operation a pellet bed 16 inches in diameter and 32 inches deep is employed, and the $UF_6$ is passed through the bed at a superficial gas velocity of about 900 to 1200 feet per hour. For $UF_6$ containing about 8 grams technetium 99 and 0.16 gram neptunium 237 per ton, approximately 95 percent of these isotopes is sorbed under these conditions. At higher velocities sorption efficiency is decreased. Under a given set of conditions the maximum velocity for efficient operation may be increased by increasing the depth of the bed. At lower velocities the sorption capacity of the $MgF_2$ is increased.

The sorption temperature is not critical, but for the preferred gas-phase contacting embodiment, a temperature above the $UF_6$ condensation temperature 133.5° is the triple point) is required. A temperature of about 200° F. to 250° F. is preferred since the product $UF_6$ stream from reactors wherein $UF_4$ is reacted with fluorine is normally handled at this temperature. The impure $UF_6$ may be conveniently fed directly from a fluorination reactor through a $MgF_2$ pellet bed for purification by the present process prior to being recovered by cold-trapping.

The $MgF_2$ pellet bed sorbs the volatile fluoride impurities at high efficiency, e.g., 95 to 99 percent for technetium, until the bed is loaded almost to capacity, at which point efficiency drops sharply. The gas-phase sorption capacity of typical $MgF_2$ pellets is 0.004 to 0.008 gram technetium per gram $MgF_2$, and approximately this value for the other impurities mentioned above. The pellet bed may be reused following the desorption and regeneration treatments described below.

Technetium is readily desorbed by washing the $MgF_2$ with water, over 98 percent of the technetium being removed by this means. Neptunium, when present together with technetium, is removed to the extent of approximately 10 to 40 percent by this step. The resulting wash solution is then processed to separately recover the technetium and neptunium values. In addition to technetium and neptunium this solution may contain appreciable amounts of soluble uranium compounds and other metallic fluoride impurities such as fluorides of aluminum, chromium, iron, potassium, manganese, molybdenum and nickel. An alkaline reagent such as an aqueous potassium hydroxide solution is first added to the solution, whereby the neptunium and uranium values, and a portion of the other metallic impurities, are precipitated. The precipitate is then separated by conventional means such as filtration, leaving the technetium, together with fluoride ions and the remainder of the metallic impurities, in aqueous solution. The technetium may then be recovered in highly pure form by subjecting the solution to previously known purification procedures. It is preferred to purify the technetium by contacting the solution with an ion-exchange resin, whereby the technetium is preferentially sorbed. A strongly basic anion exchanger with a trimethyl benzyl ammonium active group, available commercially under the trade name "Dowex 21-K," is suitable for this purpose. The technetium is then eluted with a nitric acid solution, preferably at a concentration of at least about 8 molar. In order to remove the fluoride ions remaining in the nitric acid solution the solution is again neutralized, and the ion-exchange purification treatment is repeated. The technetium product is then obtained in high-purity form in nitrate solution.

The remainder of the neptunium (60 to 90 percent) is removed from the washed $MgF_2$ bed by contacting the bed with a heated nitric acid solution, preferably having a nitric acid concentration of 0.1 molar to 1.0 molar. The nitric acid solution is contacted with the bed at a solution temperature of at least 160° F., and preferably about 200° F. Although not critical, removal of neptunium is further enhanced by providing a small amount of aluminum nitrate, e.g., 0.5 molar, in the nitric acid solution. The resulting neptunium-bearing solution, which may also contain metallic impurities such as uranium, magnesium, aluminum, calcium, chromium, iron, vanadium and potassium values, is then treated by previously known methods to recover the neptunium in high-purity form. In a preferred procedure the acidity of the neptunium-bearing solution is adjusted to about 8 molar nitric acid, and the neptunium is converted to the tetravalent state by addition of ferrous sulfamate. The resulting solution is contacted with an anion-exchange resin column to preferentially sorb the neptunium. The column is then washed, and the neptunium is eluted with a dilute, e.g., 0.3 molar, nitric acid solution. Neptunium may also be recovered from the neptunium-bearing precipitate obtained by neutralizing the technetium-bearing solution obtained in the initial washing of the $MgF_2$ bed as described above. The precipitate is dissolved in nitric acid and ferrous sulfamate is added in the same manner as for the neptunium-bearing nitric acid leach solution.

Molybdenum and vanadium fluorides, if present in the bed, are removed along with the technetium and neptunium. The bulk of the molybdenum is removed along with the technetium in the wash solution, while vanadium is removed with neptunium in the nitric acid leach solution. These elements are separated from technetium and neptunium in the above-described recovery procedure.

The $MgF_2$ pellets may be reused after a regeneration treatment. In the preferred procedure the pellet bed is dried in air at room temperature until about 6 percent of the moisture content remains. The pellet bed is then heated to a temperature of approximately 400° F. in air to remove further moisture. The remaining moisture is then removed by contacting the bed with air which contains about 20 percent gaseous fluorine. No external heat is supplied in this step; under typical conditions, however, the temperature of the pellet bed is increased to about 160° F. by the heat of reaction of fluorine with the remaining moisture in the bed. Drying is substantially completed after a fluorine contact time of about 8 hours. The pellet bed is then suitable for further use.

Where technetium is present in the feed $UF_6$ in an amount greater than neptunium, a typical ratio being 8 grams technetium to 0.15 gram neptunium, the $MgF_2$ may be desorbed of technetium and reused for several cycles, e.g., 4 to 5 times, prior to removal of the neptunium by hot-acid leaching as described above.

It is to be understood that small amounts of other volatile fluoride impurities such as fluorides of titanium, niobium, tantalum, antimony and ruthenium may be present in the feed $UF_6$ in the present process. Although the sorption behavior of these impurities is not known, it is believed that these impurities may be sorbed, at least partially, along with the impurities of primary interest, namely, technetium, neptunium, vanadium and molybdenum. The presence or absence of small amounts of impurities in the former group is not critical to the process of my invention.

The purified effluent $UF_6$ gas is suitable for use as feed for isotope separation by means of gaseous diffusion without further treatment.

The embodiment of my invention wherein technetium and neptunium values are separated from $UF_6$ and recovered in purified form is illustrated by the flowsheet in the accompanying drawing.

My invention is further illustrated by the following specific examples.

Example 1

Technetium values were sorbed from reprocessed $UF_6$ in a laboratory scale test by means of the following procedure: 363 grams of magnesium fluoride in the form of ¼ to ⅛ inch diameter pellets was disposed as a bed with a depth of 30 inches in a cylindrical reactor with an inside diameter of 1.1 inches. $UF_6$ containing technetium in volatile fluoride form at a proportion of 9 grams technetium per million grams $UF_6$ was passed through the bed at a superficial gas velocity of 980 feet per hour and at a temperature of 200° F. The technetium content of the effluent $UF_6$ stream was determined by sampling and analyzing. Approximately 99 percent of the technetium was adsorbed from the $UF_6$ until more than 330 kilograms of $UF_6$ had been passed through the bed. At this point the amount of technetium adsorbed decreased sharply, indicating loading of the bed to capacity.

Example II

Technetium was separated from large quantities of $UF_6$ by means of the following procedure: Reprocessed $UF_6$ from a large-scale fluorination reactor was fed through a bed of magnesium fluoride pellets. The pellet bed, containing 164 pounds of $MgF_2$, was 16 inches in diameter and 30 inches deep, and the pellets were 0.095 inch to 0.25 inch in diameter. The $UF_6$ feed contained 11 grams technetium per ton of $UF_6$. The effluent $UF_6$ was periodically sampled and analyzed for technetium content. The absorption temperature was 200° F. 93 to 95 percent of the technetium was removed until 430,000 pounds of $UF_6$ had passed through the bed. The percentage of technetium removed then decreased, indicating loading of the bed to capacity.

Example III

Neptunium was separated from large quantities of $UF_6$ by means of the following procedure: Reprocessed $UF_6$ from a large-scale fluorination reactor was fed through two beds of $MgF_2$ pellets in parallel. Each pellet bed, containing 1100 pounds of $MgF_2$, was 39 inches in diameter and 30 inches deep, and the pellets were $-0.25$ to $+0.125$ inch in diameter. The $UO_3$ from which the $UF_6$ was produced contained trace neptunium at a level of 0.16 part per million, based on uranium. Analysis of the $MgF_2$ after passing $2.93 \times 10^6$ pounds of $UF_6$ through the two traps indicated a trace recovery of 91 percent. The sorption temperature was 200° F.

Example IV

Molybdenum and vanadium were separated from large quantities of $UF_6$ by means of the following procedure: Reprocessed $UF_6$ from a large-scale fluorination reactor was fed through a bed of $MgF_2$ pellets at a temperature of 200° F. The pellet bed, containing 235 pounds of $MgF_2$, was 16 inches in diameter, 43 inches deep, and the pellets were $-.207$ to $+0.125$ inch in diameter. The $UO_3$ from which the $UF_6$ was produced contained less than 0.1 part per million molybdenum and less than 0.2 part per million vanadium. Before exposure the $MgF_2$ contained less than 0.1 part per million molybdenum and less than 0.2 part per million vanadium. Due to the low concentrations of molybdenum and vanadium, it was impractical to take inlet and outlet $UF_6$ samples. However, after 529,000 pounds of $UF_6$ was passed through the bed, the bed was removed, and the $MgF_2$ contained 500 parts per million molybdenum and 88 parts per million vanadium. Since the concentrations of molybdenum and vanadium in $UO_3$ were below the analytical detection limit, it was not possible to calculate a percent recovery. A portion of the molybdenum was probably present in the $UF_6$ feed as a result of having been picked up by corrosion of molybdenum-containing reactors employed in the conversion of $UO_3$ to $UF_6$.

My invention is not to be understood as limited by the above examples, but is limited only as indicated by the appended claims. It is also to be understood that variations in apparatus and procedure may be employed by one skilled in the art without departing from the scope of my invention.

Having thus described by invention, I claim:

1. The process of recovering technetium values and neptunium values from $UF_6$ containing the same in volatile fluoride form which comprises contacting said $UF_6$ in gaseous form with a bed of $MgF_2$ pellets at a temperature above 133.5° F., whereby said technetium values and neptunium values are sorbed, desorbing the resulting sorbed neptunium values and the resulting sorbed technetium values and purifying the resulting desorbed neptunium values and the resulting desorbed technetium values.

2. The process of claim 1 wherein said $UF_6$ is contained with said $MgF_2$ pellet bed at a temperature of approximately 200° F. to 250° F.

3. The process of claim 1 wherein the diameter of said pellets is within the range of 0.09 inch to 0.25 inch.

4. The process of separately recovering technetium values and neptunium values from $UF_6$ containing the same in volatile fluoride form which comprises contacting said $UF_6$ in the gaseous state with a bed of $MgF_2$ pellets at a temperature above 13.5° F., whereby said technetium values and said neptunium values are sorbed, separating the resulting technetium-depleted and neptunium-depleted $UF_6$ from said bed, contacting said bed with water, whereby said technetium values and a minor portion of said neptunium values are dissolved, adding an alkaline reagent to the resulting solution, whereby a neptunium-bearing precipitate is formed, separating said precipitate from the remaining technetium-bearing solution, recovering said technetium values from said technetium-bearing solution, contacting said bed with a nitric acid solution at a temperature of at least about 160° F., whereby the remaining sorbed neptunium values are dissolved, and recovering said neptunium values from the resulting neptunium-bearing solution.

5. The process of claim 4 wherein said remaining technetium-bearing solution is contacted with a strongly basic ion-exchanger, whereby said technetium values are sorbed, and the resulting technetium-bearing ion-exchanger is contacted with a nitric acid solution.

6. The process of claim 4 wherein the concentration of said nitric acid solution is from 0.1 molar to 1.0 molar.

7. The process of recovering technetium values from $UF_6$ containing the same in volatile fluoride form which comprises contacting said $UF_6$ in the gaseous state with a bed of $MgF_2$ pellets at a temperature above 133.5° F., whereby said technetium values are sorbed, separating the resulting technetium-depleted $UF_6$ from said bed, contacting said bed with water, whereby said technetium values are dissolved, and purifying the resulting technetium-bearing solution.

8. The process of separating volatile fluoride values of at least one metal in the group consisting of technetium, neptunium, molybdenum and vanadium from gaseous $UF_6$ containing the same which comprises intimately contacting said $UF_6$ in gaseous form with magnesium fluoride whereby said volatile fluoride values are selectively sorbed.

9. The process of purifying $UF_6$ contaminated with volatile fluoride values of at least one metal in the group consisting of technetium, neptunium, molybdenum and vanadium which comprises contacting said $UF_6$ in gaseous form with a bed of $MgF_2$ pellets at a temperature above 133.5° F. whereby said volatile fluoride values are selectively sorbed and recovering the resulting purified $UF_6$.

10. The process of separating volatile technetium fluoride values and volatile neptunium fluoride values from $UF_6$ containing the same, said $UF_6$ being prepared by reprocessing of neutron-irradiated uranium, which comprises contacting said $UF_6$ in gaseous form with a bed of $MgF_2$ pellets at a temperature above 133.5° F. whereby said technetium values and said neptunium values are selectively sorbed.

References Cited by the Examiner
UNITED STATES PATENTS

| | | | |
|---|---|---|---|
| 2,907,630 | 10/59 | Lawroski et al. | 23—14.5 |
| 2,952,511 | 9/60 | Maddock | 23—14.5 |

OTHER REFERENCES

AEC Document ORNL, 2614, pp. 148–150, Div. 20, 1958.

Flagg: "Chemical Processing of Reactor Fuels," pp. 478, 479 (1961).

CARL D. QUARFORTH, *Primary Examiner.*